(12) United States Patent
Feinberg et al.

(10) Patent No.: US 8,044,332 B2
(45) Date of Patent: Oct. 25, 2011

(54) HYBRID ARCHITECTURE ACTIVE WAVEFRONT SENSING AND CONTROL SYSTEM, AND METHOD

(75) Inventors: Lee D. Feinberg, Silver Spring, MD (US); Bruce H. Dean, New Market, MD (US); Tristram T. Hyde, Severna Park, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 300 days.

(21) Appl. No.: 12/553,613

(22) Filed: Sep. 3, 2009

(65) Prior Publication Data

US 2011/0049329 A1    Mar. 3, 2011

(51) Int. Cl.
*G01J 1/20* (2006.01)

(52) U.S. Cl. ............. 250/201.9; 356/512; 398/122
(58) Field of Classification Search ............ 250/201.1, 250/201.9, 216; 356/139.04, 153, 508, 511, 356/512; 398/119, 122, 123
See application file for complete search history.

(56) References Cited

U.S. PATENT DOCUMENTS 7,639,369 B2 * 12/2009 Owner-Petersen et al. ... 356/512
7,764,385 B1 * 7/2010 Dey ............................ 356/518

* cited by examiner

*Primary Examiner* — Kevin Pyo
(74) *Attorney, Agent, or Firm* — Christopher O. Edwards

(57) ABSTRACT

According to various embodiments, provided herein is an optical system and method that can be configured to perform image analysis. The optical system can comprise a telescope assembly and one or more hybrid instruments. The one or more hybrid instruments can be configured to receive image data from the telescope assembly and perform a fine guidance operation and a wavefront sensing operation, simultaneously, on the image data received from the telescope assembly.

20 Claims, 2 Drawing Sheets

HYBRID ARCHITECTURE ACTIVE WAVEFRONT SENSING AND CONTROL SYSTEM, AND METHOD

STATEMENT OF GOVERNMENT INTEREST

The invention described herein was made by employees of the United States Government and may be manufactured and used by or for the Government of the United States of America for governmental purposes without the payment of any royalties thereon or therefor.

FIELD

The present invention relates to a detection and control instrument configured to receive image data from a telescope assembly and perform fine guidance sensing and wavefront sensing and control, on the image data.

BACKGROUND

The current state of the art in wavefront sensing and control and thermal stability control for telescopes is performed periodically. A telescope's primary mirror can comprise a plurality of mirror segments, the primary mirror can be a single unit. Fine phasing can be performed using each primary mirror segment. This can be achieved using phase retrieval methods that require moving a filter wheel, pointing at a star, and using the main science camera to take an image. For the current state of the art, fine phasing updates of the primary mirror segments occur approximately once every 14 days. In between, the architecture for the telescope relies on passive thermal stability to meet the allocated wavefront error allocation, a highly challenging capability. Wavefront sensing and control, and passive thermal stability architecture, will not suffice for mirrors designed to be used in the future, because the mirror and composite structure is not sufficiently stable to meet an acceptable allocation, for example, about 5 nm root means squared.

Furthermore, some systems are very complex and expensive and can include edge sensors and laser trusses. Thus, a technique is needed to improve the thermal stability and fine phasing update architecture of a UV-optical telescope. The system and method described herein have limited impact on the overall complexity of the system, particularly of the primary mirror system.

SUMMARY

The present teachings provide a hybrid instrument that performs both fine guidance sensing and wavefront sensing and control. The instrument eliminates the need for other more complex ways of achieving very accurate sensing and control that is needed for optical applications. In the current state of the art, for example, in the James Webb Space Telescope (JWST), the primary mirror is updated approximately every 14 days to adjust for thermal stability. Once updated, the JWST relies on passive thermal stability for the next 14 days, until the mirror is updated again. This can oftentimes lead to dynamic disturbances, for example jitter in the mirror. A solution to this problem is to update the mirrors of an optical telescope more frequently. Optical telescopes can be used to perform both fine guidance, and wavefront sensing and control. During fine guidance, the optical telescope can provide pointing error signals that can be used to achieve alignment of the one or more mirrors of the telescope. Often this is performed by focusing on an individual guide star. Optical telescopes can also be used to perform wavefront sensing and control, which can comprise measuring a wavefront of an image for aberration in a coherent signal to describe the optical quality or lack thereof in an optical system. Up to this point, both fine guidance and wavefront sensing have required separate instruments. To solve this problem, the present invention combines both fine guidance and wavefront sensing into a single instrument.

According to various embodiments of the present teachings, an optical system is provided that comprises a telescope assembly and one or more hybrid instruments in electrical communication with the telescope assembly. The telescope assembly can comprise at least one minor, for example, a primary minor and a secondary minor. The hybrid instrument can be configured to perform a fine guidance operation while simultaneously being configured to perform a wavefront sensing operation, on image data received by the telescope assembly. In some embodiments, the hybrid instrument can be configured to generate instructions to adjust a position of at least one minor, for example, at least one of a primary mirror and a secondary mirror.

According to various embodiments, the hybrid instrument can comprise a pickoff mirror configured to receive image data from the telescope assembly and direct the image data along a first radiation beam path. The hybrid instrument can also comprise one or more beam splitters. The one or more beam splitters can be used to split a first radiation beam into a plurality of split beams. The hybrid instrument can comprise one or more detectors that are configured to detect the plurality of split beams. In some embodiments, at least two split beams, three split beams, and/or all split beams are directed to the same single detector. Each beam splitter can be the same as or different than at least one other of the beam splitters. In some embodiments, the beam splitter for the first radiation beam comprises a 90/10 beam splitter, and a second beam splitter is included that is a 50/50 beam splitter.

According to various embodiments, the hybrid instrument can comprise one or more sets of modulating optics that can be disposed between the entrance of the telescope assembly wherein a first radiation beam to be detected enters the telescope assembly, and In some embodiments, some or all of the components of the hybrid instrument can be disposed in a housing. The optical system can further comprise a computer in electrical communication with the hybrid instrument and the telescope assembly, wherein the computer can be configured to perform phase retrieval algorithms. In some embodiments, the optical system can comprise a plurality of hybrid instruments, for example, two instruments, three instruments, four instruments, or more. In some embodiments, the plurality of hybrid instruments can be configured to receive image data from separate and distinct points of view.

According to various embodiments of the present teachings, provided herein is a method that can comprise performing both a fine guidance sensing operation and a wavefront sensing operation, on image data. The method can comprise receiving a first radiation beam with a telescope assembly. The first radiation beam can be split with a beam splitter into two split beams, each of which can be directed toward one or more detectors. At least one of the split beams can be further split by another beam splitter into two or more split beams, for example, into third and fourth split beams. The method can comprise detecting the one or more split beams with at least one detector. Image data can be generated based on the one or more split beams. A fine guidance sensing operation, a wavefront sensing operation, or both, can be performed on the image data. According to various embodiments, the method can comprise reflecting the first radiation beam with a primary mirror, then with a secondary mirror, before the first radiation beam is split by the first beam splitter. One or both of the primary mirror and the secondary minor can be adjusted based on the image data detected by the one or more detectors.

BRIEF DESCRIPTION OF THE DRAWINGS

The present teachings will be described with reference to the accompanying drawings. The drawings are intended to illustrate, not limit, the present teachings.

DETAILED DESCRIPTION OF THE PRESENT INVENTION

Figure 1:
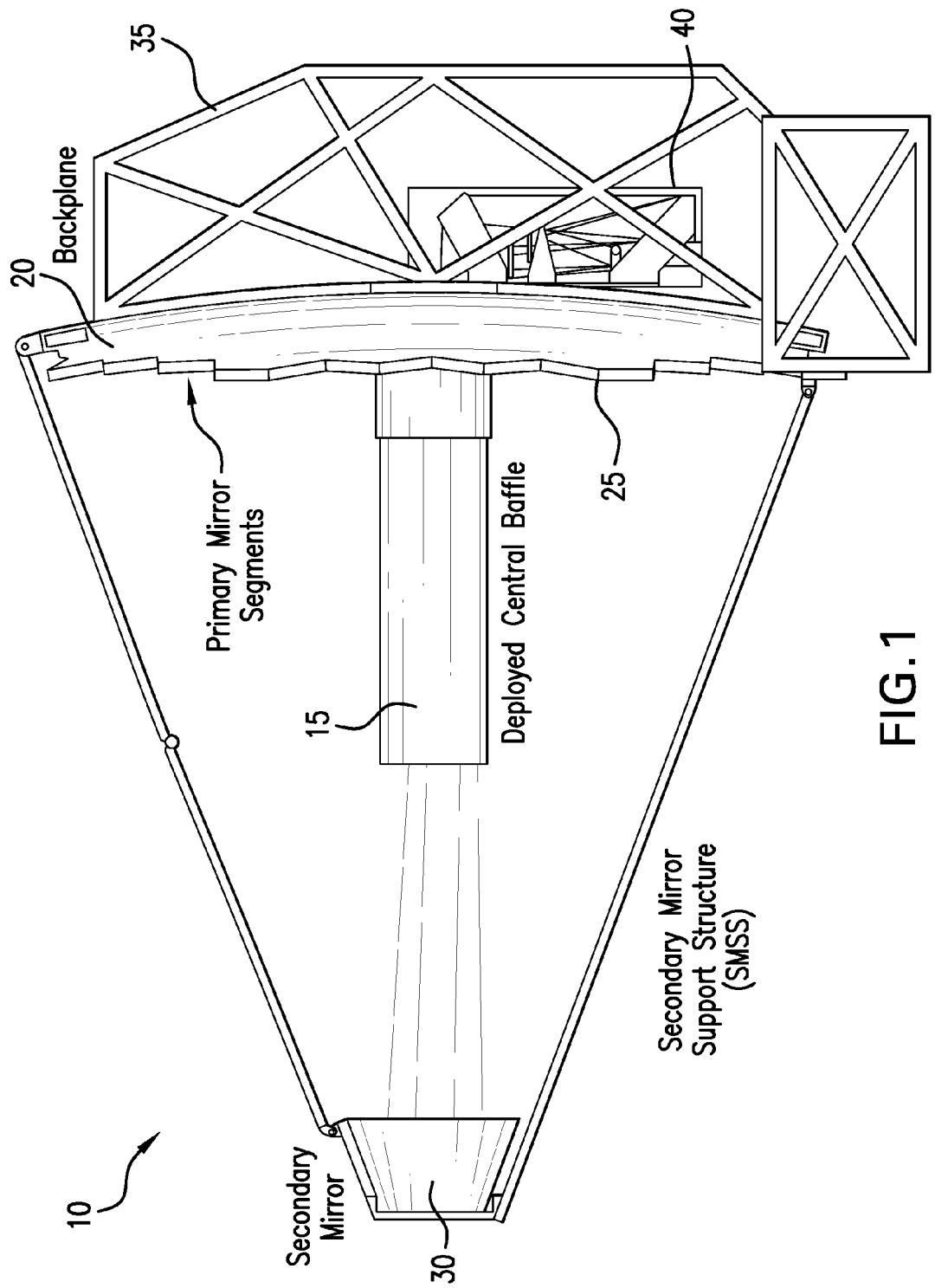
FIG. 1 illustrates a telescope assembly according to various embodiments of the present teachings and which comprises a segmented primary mirror.

According to various embodiments, the present teachings provide a hybrid instrument for performing active wavefront sensing and control. The instrument can utilize a fine guidance sensor (FGS) that is already used to maintain fine guidance control, or pointing, of a telescope. The FGS can perform centroiding on a star and send the information into the pointing and control system. The hybrid instrument and method described herein can beam split the image of a guide star, for example, to generate a defocused guide star image, and to perform wavefront sensing using phase retrieval techniques. The method can comprise simultaneously performing fine guidance sensing and wavefront sensing.

According to various embodiments, phase retrieval occurs nearly constantly such that passive thermal stability over 14 days is not required, and wavefront sensing can occur approximately every 5 minutes for a primary mirror. The primary mirror can comprise a single mirror, for example, a deformable monolithic mirror. In some embodiments, the primary mirror can comprise a plurality of mirror segments, for example, 10, 18, 27, 36 segments, or another desired number of segments. Using the FGS as the sensor, it can be possible to send updated information to actuators on the primary mirror that can update the plurality of primary mirror segments. The channels can use common or separate detectors. Phase retrieval can be performed on-board an optical system, for example, on-board a telescope assembly.

According to various embodiments of the present teachings, an optical system is provided that can comprise a telescope assembly and one or more hybrid instruments in electrical communication with the telescope assembly. The telescope assembly can comprise a primary mirror that in turn comprises a plurality of mirror segments. In some embodiments, each of a plurality of the individual mirror segments can be actuated independently from other segments. The telescope assembly can comprise, for example, a ground-based telescope or a space-based telescope. The hybrid instrument can be configured to perform a fine guidance sensing operation while simultaneously being configured to perform a wavefront sensing operation on image data received by the telescope assembly. In some embodiments, the hybrid instrument can be configured to generate instructions to adjust a position of one or more segments of the primary mirror, or the secondary mirror.

According to various embodiments, the hybrid instrument can comprise a pickoff mirror configured to receive image data from the telescope assembly and direct the image data along a first radiation beam path. The hybrid instrument can also comprise one or more beam splitters. For example, the hybrid instrument can comprise a first beam splitter disposed along a first radiation beam path and configured to (i) receive a first radiation beam, (ii) allow a portion of the first radiation beam to pass through as a first split beam, and (iii) reflect a portion of the first radiation beam as a second split beam along a second split beam path. The hybrid instrument can comprise a second beam splitter disposed along the second split beam path and configured to allow a portion of the second split beam to pass through as a third split beam along a third split beam path, and configured to reflect a portion of the second split beam as a fourth split beam along a fourth split beam path. The hybrid instrument can comprise one or more detectors disposed along the first split beam path, the fourth split beam path, and the third split beam path. In some embodiments, the hybrid instrument comprises 3 beam splitters, a first detector for receiving the first split beam, a second detector for receiving the fourth split beam, and a third for receiving the third split beam.

According to various embodiments, the hybrid instrument can comprise modulating optics, for example, first modulating optics and second modulating optics. The first modulating optics can be disposed along a first split beam path between a first beam splitter and one or more detectors. The second modulating optics can be disposed along a third split beam path between a second beam splitter and the one or more detectors. Each modulating optics can comprise either a negative lens or a positive lens. In some embodiments, the first modulating optics comprises a negative lens and the second modulating optics comprises a positive lens. In some embodiments, the first modulating optics comprises a positive lens and the second modulating optics comprises a negative lens. The negative and positive lenses can be used to defocus an image into two defocused images. Phase retrieval techniques can be performed on the defocused images to determine the phase of the telescope assembly.

In some embodiments, some or all of the components of the hybrid instrument can be disposed in a housing. The optical system can further comprise a computer in electrical communication with the hybrid instrument and the telescope assembly, wherein the computer can be configured to perform wavefront sensing, a phase retrieval algorithm, a combination thereof, other algorithms and programs, or the like. In some embodiments the wavefront sensing need not use a phase retrieval. In some embodiments a Shack Hartmann sensor can be used for wavefront sensing. In some embodiments a wavefront sensor and fine guidance sensing system share a beam of light from the same star and the system uses beamsplitter optics.

According to various embodiments, the optical system can comprise a plurality of hybrid instruments, for example, two instruments, three instruments, four instruments, or more. A first hybrid instrument can be in electrical communication with the primary minor and can be configured to simultaneously perform a wavefront sensing operation and a fine guidance sensing operation for the primary mirror. At least one hybrid instrument, for example, three hybrid instruments, can be in electrical communication with the secondary minor and can be configured to simultaneously perform a wavefront sensing operation and a fine guidance sensing operation for the secondary minor. In some embodiments, the plurality of hybrid instruments can be configured to receive image data from separate and distinct points of view.

According to various embodiments of the present teachings, a method is provided that comprises performing a fine guidance sensing operation and a wavefront sensing operation on image data. The method can comprise receiving a radiation beam with a telescope assembly. The radiation beam can be split with one or more beam splitters and can be directed toward one or more detectors. For example, the method can comprise splitting a first radiation beam with a first beam splitter disposed along a first radiation beam path, such that a portion of the first radiation beam passes through the first beam splitter as a first split beam, and a portion of the first radiation beam is reflected as a second split beam along a second split beam path. The method can further comprise, splitting the second split beam with a second beam splitter such that a portion of the second split beam passes through the second beam splitter as a third split beam along a third split beam path, and a portion of the second split beam is reflected by the second beam splitter as a fourth split beam along a fourth split beam path.

According to various embodiments, the method can comprise detecting the one or more split beams with at least one detector. Image data can be generated based on the one or more split beams. A fine guidance sensing operation and a wavefront sensing operation can be performed on the generated image data. In some embodiments, the at least one detector comprises at least three detectors, and the at least three detectors comprise a first detector for detecting the first split beam, a second detector for detecting the fourth split beam, and a third detector for detecting the third split beam. In some embodiments, the wavefront sensing operation can be performed using image data generated by the first detector and by the third detector, and the fine guidance sensing operation is performed using image data generated by the second detector.

According to various embodiments, the method can comprise reflecting the first radiation beam with a primary mirror and/or with a secondary mirror before the first radiation beam is split by the first beam splitter. The primary mirror and/or the secondary mirror can be adjusted based on the image data generated by the one or more detectors. Each detector can comprise a charge coupled device, a camera, a photomultiplier tube, a combination thereof, or the like.

According to various embodiments, the optical system of the present teachings can comprise an active telescope, for example, a telescope comprising a primary mirror and one or more secondary mirrors. Each mirror can be linked to, for example, in operable communication with, an independent hybrid instrument as described herein, or the mirrors can be linked to the same hybrid instrument. The primary mirror and/or the secondary mirror can be controlled to be oriented to improve the focus of the optical system. According to various embodiments, the telescope assembly can comprise one or more channels, for example, the telescope assembly can comprise an ultra-violet channel and a planet-finding channel.

In some embodiments, the primary mirror of the telescope assembly can be made of a rigid material, a deformable material, a glass material, or the like. In some embodiments, the primary minor can comprise a low expansion glass or an ultra low expansion (ULE) glass. The primary minor of the present teachings can be of unitary construction, can have a split construction, or can comprise a plurality of mirror segments, for example, a plurality of minor segments that work together in unison.

According to various embodiments, the one or more secondary minors can be made of the same or different material as the primary minor. The secondary mirror can comprise low expansion glass, ultra-low expansion (ULE) glass, and/or have comparable specifications to those of the primary minor. In some embodiments, the secondary mirror can comprise a single, smaller minor compared to the primary mirror. The secondary mirror can comprise a deformable mirror. The secondary mirror assembly can provide movements in degrees-of-freedom similar to, or different than, those of the primary mirror. The primary mirror and the secondary mirror can each independently comprise one or more motors, latches, baffle systems, or the like, or a combination thereof.

According to various embodiments, a primary mirror actuation scheme can be provided for moving and controlling the primary minor segments. The actuation scheme can include a coarse stage that can achieve initial alignment of the plurality of mirror segments. In addition, the scheme can be carried out outside of the FGS by locking onto a star similar to that focused on by the FGS. There are also multiple ways to achieve phase diversity that can be used, for example, by using diffraction gratings and filters or weak lens filter wheels. Examples of phase retrieval are described in U.S. Patent Application Publication No. US 2008/0040077, to Bruce H. Dean, published on Feb. 14, 2008, which is incorporated herein by reference in its entirety.

According to various embodiments, the radius of curvature error that can result from actuating the primary minor segments, can be improved through additional polishing iterations and better metrology, for example, testing mirrors phased to each other. In some embodiments improvements are achieved through calibration and modeling approaches. Examples of the types of mirrors that can be used in the optical system include mirror architectures having, a semi-rigid degree of freedom, and/or other higher authority mirror systems and architectures that can reduce induced radius errors. According to various embodiments of the present teachings, the telescope assembly can comprise a mount system configured for a degrees-of-freedom movement. The mount system can comprise a system with tip, tilt, piston, decenter, and rotation control capability and a separate radius of curvature strongback system for actuating the radius. The mount system can be in contact with the primary minor and can be used to actuate the primary mirror segments. The telescope assembly can comprise one or more actuators. The actuators can comprise BALL actuators available, for example, from Venture Manufacturing Co., Dayton, Ohio, or other actuators, for example, lead magnesium niobate, piezo-based actuators, and the like.

One example of a guidance system is a fine guidance sensor (FGS) that provides pointing information for a spacecraft. An FGS can also function as a scientific instrument for astrometric science. The Hubble Space Telescope, designed by the National Aeronautics and Space Administration (NASA), comprises a plurality of FGSs. An FGS can comprise a housing that houses a collection of mirrors, lenses, servos, prisms, beam splitters, photomultiplier tubes, charge coupled devices, and/or HgCdFe detectors.

An exemplary telescope assembly wherein a hybrid architecture active wavefront sensing and control system can be incorporated is the Advanced Technology Large-Aperture Space telescope (ATLAST) that is being designed by NASA. Another exemplary telescope assembly wherein such a hybrid architecture can be incorporated is the James Webb Space Telescope (JWST) that is also being designed by NASA. The telescope assembly can comprise any desired mirrors, for example, a two-mirror Cassegrain channel for ultraviolet science and planet-finding instruments, and a four-mirror Wide Field Of View (WFOV) channel. In some embodiments, the telescope assembly can comprise two primary mirror wings that contain a plurality of mirror segments, a secondary minor support structure that deploys the secondary mirror, and a deployed central baffle for controlling stray light. The primary mirror segments can be held on a large composite backplane. Basic elements of an exemplary telescope assembly are shown in FIG. 1.

FIG. 1 illustrates a telescope assembly 10 according to various embodiments of the present teachings. Telescope assembly 10 can comprise a primary mirror 20 that comprises a plurality of mirror segments 25, for example, 10 mirror segments, 18 mirror segments, 27 mirror segments, 36 mirror segments, or more. Mirror segments 25 can be held in place by a composite backplane 35. Each mirror segment 25 can comprise its own actuator that can adjust the position of the mirror segment. Telescope assembly 10 can comprise a central baffle 15 that can be configured to control stray light. Telescope assembly 10 can further comprise a secondary mirror 30 that can be used to receive image data from the primary mirror and direct the image data through central baffle 15 into optics system 40. Optics system 40 can comprise a control unit that can be used to independently control actuation of the plurality of mirror segments 25. In some embodiments, optics system 40 can be controlled remotely by a user through a wireless network, for example, by a user located on the ground, while the telescope assembly is in space, for example, in orbit above a planet.

According to various embodiments of the present teachings, active wavefront sensing and control can comprise updating the primary mirror approximately every 1 to 60 minutes and updating the secondary mirror once every 1 to 100 hours. The active architecture replaces passive thermal architecture that would update the primary mirror every 14 days and update the secondary minor approximately once a year.

According to various embodiments, the hybrid instrument described herein can perform both fine guidance and wavefront sensing. As such, the hybrid instrument can comprise one or more sensors that can be configured to receive wavefront error. In some cases, the wavefront error can be broken down into contributions from an Optical Telescope Assembly (OTA), and from wavefront sensing and control (WFSC). The OTA error can be further broken down into contributions from the primary mirror and contributions from the secondary mirror.

Figure 2:
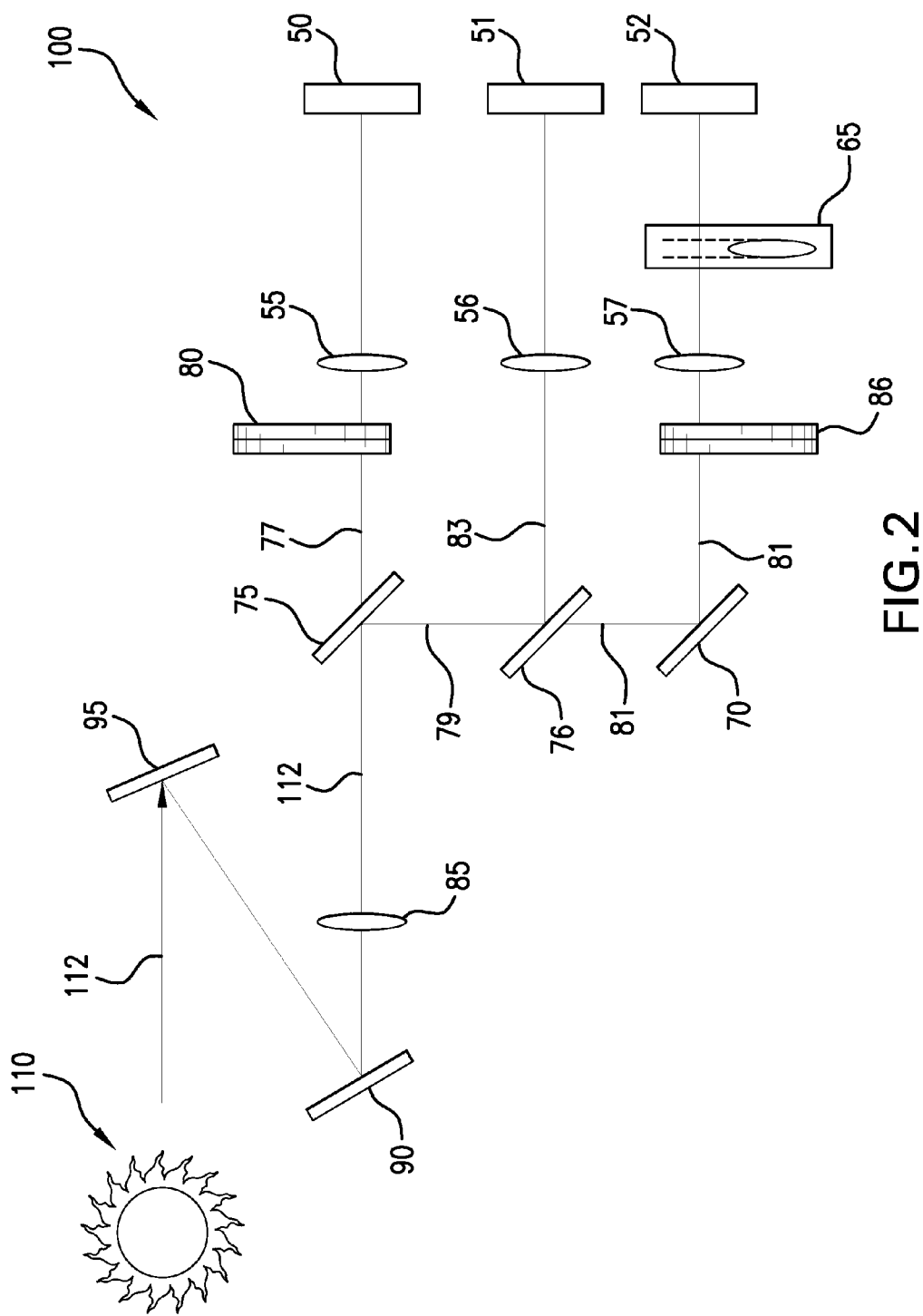
FIG. 2 illustrates a hybrid instrument configured to receive emission beams generated by the telescope assembly of FIG. 1, according to various embodiments of the present teachings.

According to various embodiments, an exemplary hybrid instrument can be the hybrid guidance and wavefront sensing system, also referred to herein as the hybrid instrument, 100, as shown in FIG. 2. Hybrid instrument 100 can receive radiation, for example, light images, from telescope assembly 10 shown in FIG. 1. Hybrid instrument 100 can comprise one or more detectors. As shown in FIG. 2, hybrid instrument 100 comprises three detectors, for example, wavefront sensing detectors 50 and 52, and fine guidance sensing detector 51.

Although the hybrid instrument and method of the present teachings can be used to detect many types of radiation, reference to radiation in the form of light will be used to exemplify the instrument and method. Light 112 from a star 110 can be fed from a telescope assembly to a pickoff mirror 95. Pickoff mirror 95 directs light 112 onto a secondary mirror 90, for example, a bi-directional star selection mirror that can allow for the field of view of the detectors to be extended while keeping the overall length of the system within reason. Secondary mirror 90 can direct light 112 toward a first beam splitter 75. In some embodiments, modulating optics 85 can be disposed along the beam path of light 112 between mirror 90 and beam splitter 75. As described herein, modulating optics 85 can comprise one or more filters, lenses, prisms, other optical elements, or a combination thereof.

According to various embodiments, beam splitter 75 can allow for a portion of light 112 to pass through beam splitter 75 as a first split beam 77 directed toward WFS detector 50, while simultaneously reflecting a portion of light 112 as a second split beam 79 along a beam path toward a second beam splitter 76. Beam splitter 76 splits second split beam 79 by allowing a first portion of split beam 79 to pass through as a third split beam 81 while reflecting a portion toward FGS detector 51 as fourth split beam 83. The beam path between the beam splitter 76 and the FGS detector 51 can comprise imaging optics 56, that can form a broadband image of a star on the detector. This image can be used by hybrid instrument 100 to perform, for example, centroiding and guidance. Beam splitter 76, while directing split beam 83 toward FGS detector 51, can direct split beam 81 toward a mirror 70. Mirror 70 can direct split beam 81 toward WFS detector 52.

As will be appreciated, the number of detectors is not limited to three. For example, hybrid instrument 100 can comprise a single detector that can receive all three beams, or can comprise a different number of detectors. Hybrid instrument 100 can be a telecentric system that can remove pupil amplitude and shape uncertainty. This feature can allow for the WFS retrieval algorithm to operate more efficiently. In some embodiments, one or more of the detectors can be replaced with a Shack-Hartmann sensor.

Modulating optics can be disposed between beam splitter 75 and WFS detector 50. For example, the modulating optics can comprise a filter wheel 80 and a weak lens 55. Modulating optics can be disposed between mirror 70 and WFS detector 52. For example, the modulating optics can comprise a filter wheel 86 and a weak lens 57.

According to various embodiments, the modulating optics along the beam paths leading to WFS detector 50 and WFS detector 52 can be used to defocus the image of a star. For example, weak lens 55 disposed between beam splitter 75 and WFS detector 50 can be a weak positive lens, while weak lens 57 disposed between mirror 70 and WFS detector 52 can be a weak negative lens, or vice versa. In some embodiments, one or more actuated pupil imaging lenses 65 can be disposed along the beam path of one or more of split beams 77, 81, and 83 and can be used to create an image of a telescope pupil on the detectors. In the embodiment exemplified in FIG. 2, actuated pupil imaging lens 65 is disposed along the path of split beam 81. In some embodiments, the overall size of hybrid instrument 100 can be reduced, for example, by reducing the number of filters needed on a filter wheel and/or by folding one or more of the beam paths.

According to various embodiments, the hybrid instrument can be calibrated. For hybrid instruments that are disposed near the edge of the field of view of an observatory, the wavefront error can be larger than when the hybrid instrument is disposed on axis. Uncertainty of this wavefront error can degrade performance of the phase retrieval algorithms that can be used to perform wavefront sensing. Furthermore, each hybrid instrument can comprise one or more internal aberrations that are not in common with other instruments in the observatory. Additional components can be used to mitigate these problems, for example, the focal surface of a telescope assembly can be adjusted. A series of calibrating light emitting diodes (LEDs) and point diffraction interferometer pinholes can be mounted near the focal surface of the primary mirror of the optical telescope assembly. The LEDs can be aimed toward the WFS detectors to provide point like sources which can allow for wavefront sensing to be performed. These LEDs can be used to calibrate aberrations of the hybrid instrument itself. A star that is aimed at a pinhole can produce an interference pattern on the one or more detectors. The interference pattern can be used to determine low-order optical telescope assembly aberrations due to the location of the hybrid instrument near the edge of the field of view of the primary mirror. Knowledge of these aberrations can be used in wavefront sensing algorithms that are used to control the primary mirror segments.

In some embodiments, each hybrid instrument can be configured to perform both fine guidance sensing and wavefront sensing and control. In some embodiments, two hybrid instruments can be used for guiding the telescope assembly, for example, one hybrid can be used for centroiding to generate commands to control the secondary mirror, and the second hybrid can be used to look at a field point different from the field of view of the first hybrid, to sense observatory roll.

When performing fine guidance, the telescope assembly can focus on a guide star. Initially, a full image of the guide star can be captured by the telescope assembly. The location of the guide star can be determined and the primary and secondary mirrors can be actuated to position the image of the star in the center of the image frame. An image window about the star can be taken and read out and the telescope assembly can perform centroiding.

According to various embodiments, the hybrid instrument can perform a plurality of wavefront sensing and control operations. For example, the hybrid instrument can comprise a primary minor maintenance mode where actuation and adjustment of the mirror and other optical elements can be performed. The hybrid instrument can comprise a secondary mirror maintenance mode, where the secondary minor can be adjusted to compensate for aberrations caused by the primary mirror. The hybrid instrument can comprise a commissioning and diagnostic mode, where information about the system can be retrieved.

In some embodiments, the filter wheels can be actuated to place a narrow band filter and a weak lens in each respective beam path. One path can use a positive weak lens while the other can use a negative weak lens, to produce two out-of-focus images of the star. The images can be sent to an onboard processor where a the phase-retrieval algorithm can be run and segment-motion commands can be generated. To achieve a 1-30 minute duty cycle, the phase-retrieval algorithm can be run on dedicated hardware, for example, on digital signal processors or on a field-programmable processor array. This mode can be used to correct the primary mirror wavefront error.

According to various embodiments, the secondary mirror maintenance mode can be automated and can comprise one or more hybrid instruments, for example, two, three, four, or more hybrid instruments. The one or more hybrid instruments can capture two out-of-focus images from three different points in the telescope's field of view. All six images can be sent to an onboard computer, where multi-field phase retrieval can be performed. This mode can be used to remove possible wavefront ambiguities that may be introduced by secondary mirror motion. For example, a misplaced secondary mirror can introduce an astigmatism, which can be indistinguishable from an astigmatism of the primary mirror when sensed at a single field point. Sensing at multiple field points can be used to remove this ambiguity.

According to various embodiments, a commissioning/diagnostic mode can be used after an initial deployment of a telescope, or it can be used as a diagnostic mode should the telescope become misaligned. The mode can be manually controlled and all images collected by the hybrid instruments in a space-based optical system can be sent to ground for analysis. Commissioning can involve several steps. The initial four steps after deployment can include: focus sweep through segment-image array involving identifying the point-spread functions of each segment on the WFS detectors; global alignment using phase retrieval to characterize each mirror segment individually, as well as to provide information for better secondary mirror placement; image stacking to move each point spread function to the center of the array by tilting each segment of the primary mirror; and coarse phasing using dispersed Hartmann sensor elements in the filter wheels to sense and correct piston errors between each segment. The primary minor fine phasing routine can be similar to the primary mirror maintenance routine. Multi-field alignment is similar to the secondary mirror maintenance routine. Furthermore, during commissioning, pupil images can be acquired. These pupil images can be used as constraints in the phase-retrieval algorithm.

According to various embodiments, the hybrid instrument can comprise one or more dispersal Hartmann sensors (DHS). The DHS elements can be used for coarse phasing and can be located in the filter wheels of each WFS arm of the hybrid instrument. The DHS elements can comprise a series of grisms (grating-prisms) aligned on intersections of pairs of segments.

Other embodiments will be apparent to those skilled in the art from consideration of the present specification and practice of various embodiments disclosed herein. It is intended that the present specification and examples be considered as exemplary only.

What is claimed is:

1. An optical system comprising:
a telescope assembly; and
a hybrid instrument in electrical communication with the telescope assembly, the hybrid instrument being configured to perform a fine guidance operation while simultaneously being configured to perform wavefront sensing operation on image data received by the telescope assembly, the hybrid instrument comprising
a pickoff mirror configured to receive image data from the telescope assembly and direct the image data along a first radiation beam path,
a first beam splitter disposed along a first radiation beam path and configured to (i) receive a first radiation beam, (ii) allow a portion of the first radiation beam to pass through as a first split beam, and (iii) reflect a portion of the first radiation beam as a second split beam along a second split beam path,
a second beam splitter disposed along the second split beam path and configured to allow a portion of the second split beam to pass through as a third split beam along a third split beam path, and configured to reflect a portion of the second split beam as a fourth split beam along a fourth split beam path, and
one or more detectors disposed along the first split beam path, the fourth split beam path, and the third split beam path.

2. The optical system of claim 1, further comprising a mirror disposed along the third split beam path and configured to reflect the third split beam.

3. The optical system of claim 1, wherein the telescope assembly comprises a primary mirror and the hybrid instrument is configured to generate instructions to adjust a position of the primary mirror.

4. The optical system of claim 3, wherein the primary mirror comprises a plurality of mirror segments that are each configured to be actuated independently.

5. The optical system of claim 3, wherein the primary mirror comprises a deformable mirror having movement in degrees-of-freedom.

6. The optical system of claim 1, further comprising first modulating optics disposed along the first split beam path between the first beam splitter and the one or more detectors, and second modulating optics disposed along the third split beam path between the second beam splitter and the one or more detectors.

7. The optical system of claim 6, wherein the first modulating optics comprises a negative lens and the second modulating optics comprising a positive lens.

8. The optical system of claim 6, wherein the first modulating optics comprises a positive lens and the second modulating optics comprising a negative lens.

9. The optical system of claim 1, wherein the one or more detectors comprises three detectors, a first detector configured to receive the first split beam, a second detector configured to receive the fourth split beam, and a third detector configured to receive the third split beam.

10. The optical system of claim 1, wherein the first beam splitter, the second beam splitter, and the one or more detectors are disposed in a housing.

11. The optical system of claim 1, further comprising a computer in electrical communication with the hybrid instrument and the telescope assembly, wherein the computer is configured to perform phase retrieval algorithms.

12. An optical system comprising:
a telescope assembly comprising a primary minor and a secondary minor; and
a plurality of hybrid instruments each in electrical communication with the telescope assembly, each hybrid instrument being configured to perform fine guidance while simultaneously being configured to perform wavefront sensing on image data received by the telescope assembly, each hybrid instrument comprising
a pickoff mirror configured to receive image data from the telescope assembly and direct the image data along a first radiation beam path,
a first beam splitter disposed along a first radiation beam path and configured to (i) receive a first radiation beam, (ii) allow a portion of the first radiation beam to pass through as a first split beam, and (iii) reflect a portion of the first radiation beam as a second split beam along a second split beam path, and
one or more detectors disposed along the first split beam path, and a wavefront sensor disposed along the second split beam path,
wherein one hybrid instrument is in electrical communication with the primary minor and is configured to simultaneously perform a wavefront sensing operation and fine guidance sensing operation for the primary minor, and at least one hybrid instrument is in electrical communication with the secondary minor and is configured to simultaneously perform wavefront sensing operation and fine guidance sensing operation for the secondary minor.

13. The optical system of claim 12, wherein the plurality of hybrid instruments comprises three hybrid instruments in electrical communication with the secondary minor, and each of the three hybrid instruments is configured to simultaneously perform a wavefront sensing operation and a fine guidance sensing operation for the secondary minor.

14. The optical system of claim 13, wherein each of the three hybrid instruments are configured to receive image data from three separate points of view.

15. The optical system of claim 12, wherein the wavefront sensor comprises a Shack Hartmann wavefront sensor.

16. A method comprising:
receiving a beam of radiation with a telescope assembly;
splitting the beam of radiation with a first beam splitter disposed along a first radiation beam path, such that a portion of the first radiation beam passes through the first beam splitter as a first split beam, and a portion of the first radiation beam is reflected as a second split beam along a second split beam path;
splitting the second split beam with a second beam splitter such that a portion of the second split beam passes through the second beam splitter as a third split beam along a third split beam path, and a portion of the second split beam is reflected by the second beam splitter as a fourth split beam along a fourth split beam path;
detecting the first split beam, the fourth split beam, and the third split beam, with one or more detectors;
generating image data based on the first split beam, the fourth split beam, and the third split beam; and
performing a fine guidance sensing operation and a wavefront sensing operation using the generated image data.

17. The method of claim 16, wherein the one or more detectors comprises at least three detectors, and the method comprises detecting the first split beam with a first of the three detectors, detecting the fourth split beam with a second of the three detectors, and detecting the third split beam with a third of the three detectors.

18. The method of claim 17, wherein the wavefront sensing operation is performed using image data generated by the first detector and by the third detector, and the fine guidance sensing operation is performed using image data generated by the second detector.

19. The method of claim 16, further comprises reflecting the first radiation beam with a primary mirror and a secondary mirror before the first radiation beam is split by the first beam splitter.

20. The method of claim 19, further comprising adjusting the position of at least one of the primary minor and the secondary minor based on the generated image data.

* * * * *